United States Patent
St. Jacques (10) Patent No.: US 8,998,158 B2
(45) Date of Patent: Apr. 7, 2015

(54) STABILIZING DEVICE FOR A RECEPTACLE OR SPHERICAL OBJECT

(75) Inventor: Stefan St. Jacques, Ottawa (CA)

(73) Assignee: Staybowlizer Inc., Ottawa (CA)

( * ) Notice: Subject to any disclaimer, the term of this patent is extended or adjusted under 35 U.S.C. 154(b) by 213 days.

(21) Appl. No.: 12/914,067

(22) Filed: Oct. 28, 2010

(65) Prior Publication Data

US 2012/0104214 A1    May 3, 2012

(51) Int. Cl.
| | |
|---|---|
| *A47B 91/00* | (2006.01) |
| *A01K 5/01* | (2006.01) |
| *A47G 19/10* | (2006.01) |
| *A47J 36/34* | (2006.01) |

(52) U.S. Cl.
CPC .............. *A01K 5/0135* (2013.01); *A47G 19/10* (2013.01); *A47J 36/34* (2013.01)

(58) Field of Classification Search
CPC .............. F16M 11/00; F16M 2200/08; F16M 2200/00; A47B 81/04; A47B 91/00
USPC ................ 248/205.5, 205.8, 206.3, 362, 363, 248/206.4, 309.3, 683, 688, 346.5, 346.01, 248/346.03
See application file for complete search history.

(56) References Cited

U.S. PATENT DOCUMENTS

| | | | | |
|---|---|---|---|---|
| 2,385,977 | A | * | 10/1945 | Farmer ........................ 248/205.5 |
| 2,483,166 | A | * | 9/1949 | Amberg ...................... 248/145.3 |
| 2,487,712 | A | * | 11/1949 | Johnson et al. ............. 248/145.3 |
| 2,509,133 | A | * | 5/1950 | Carew ............................ 220/1.5 |
| 2,610,492 | A | * | 9/1952 | Carew ........................ 248/145.3 |
| 3,879,005 | A | * | 4/1975 | Flick ........................... 248/205.5 |
| 4,196,882 | A | * | 4/1980 | Rognon ...................... 248/205.9 |
| 4,990,082 | A | * | 2/1991 | Lee ................................ 425/456 |
| 5,217,196 | A | | 6/1993 | Morell |
| D357,170 | S | * | 4/1995 | Wellsfry ......................... D8/349 |
| 5,634,617 | A | * | 6/1997 | Morris .......................... 248/152 |
| 5,649,634 | A | * | 7/1997 | Irizarry ......................... 211/120 |
| 6,588,718 | B2 | * | 7/2003 | Kalb ........................... 248/205.5 |
| 6,596,374 | B1 | * | 7/2003 | Adjeleian ..................... 428/131 |
| D595,565 | S | * | 7/2009 | Robertson et al. ............. D8/354 |
| 7,861,647 | B2 | * | 1/2011 | So et al. .......................... 99/339 |
| 8,028,850 | B2 | * | 10/2011 | Zimmerman .............. 220/23.89 |
| 8,096,537 | B2 | * | 1/2012 | Browne et al. .................. 269/21 |

(Continued)

FOREIGN PATENT DOCUMENTS

AU       2007100247 A4     6/2007

*Primary Examiner* — Nkeisha Smith
(74) *Attorney, Agent, or Firm* — Maier & Maier, PLLC (57) ABSTRACT

A device for stabilizing and supporting a receptacle or spherical object, the device comprising first and second support elements. The first support element comprises a frusto-conical support portion defining an annular rim at an outer periphery thereof, an inner surface and an outer surface on opposite sides thereof. The first support element also comprises a base portion which connects the first support element to the second support element. The second support element comprises an outwardly flared support portion defining an annular rim at an outer periphery thereof, as well as inner and outer surfaces. The second support element also comprises a base portion which connects to the corresponding base portion of the first support element. At least a portion of the inner surfaces of the first and second support elements forms a receptacle or spherical object contact surface. The base portions of the first and second support elements together form a central aperture through the device allowing communication between an interior of the first support element and an interior of the second support element.

17 Claims, 6 Drawing Sheets

(56) References Cited

U.S. PATENT DOCUMENTS

| | | |
|---|---|---|
| 2005/0040309 A1* | 2/2005 | Paine ......................... 248/346.5 |
| 2008/0078896 A1* | 4/2008 | Browne et al. ............. 248/205.8 |
| 2008/0265108 A1* | 10/2008 | Felici ........................... 248/127 |

* cited by examiner

STABILIZING DEVICE FOR A RECEPTACLE OR SPHERICAL OBJECT

FIELD OF INVENTION

The present invention relates to a stabilizing device for supporting and stabilizing receptacles, such as bowls, containers, pots, pans, plates and the like. In certain embodiments the device can be used, for example, to stabilize and/or secure a receptacle on a surface while mixing, heating, plating or otherwise preparing food. The device can also be used to stabilize and/or secure pet food bowls or other containers to avoid spillage or spherical objects.

BACKGROUND OF THE INVENTION

Many tools and kitchen implements are available to the modern day chef or cook. However, there continues to be a need for new and more versatile tools that make cooking easier.

Of particular relevance to the present invention is the problem experienced when using a mixing bowl. For example, when stirring or blending ingredients using a whisk or hand mixer the user must use one hand to stabilize the bowl while using the other to mix. This creates a challenge for the user to add additional ingredients when mixing, since both hands are required to do the mixing and at the same time keep the bowl from moving.

In order to address this problem the present inventor has developed a stabilizing device which is useful for supporting and stabilizing most types of receptacles, including kitchen-related implements such as bowls, containers, pots, pans, plates and the like, as well as pet food bowls and most other receptacles that are susceptible to spillage. In addition to the stabilizing function, the device also includes features which make it a particularly versatile kitchen tool.

SUMMARY OF THE INVENTION

It is an object of the invention to provide an improved stabilizing device for supporting and stabilizing receptacles, particularly kitchen related receptacles such as, but not limited to bowls, containers, pots, pans, plates and other kitchen implements.

It is also an object of the invention to provide a stabilizing device for supporting and stabilizing spherical objects, such as exercise balls and the like.

It is also an object to provide a stabilizing device for stabilizing and/or securing pet food bowls or other containers that may be susceptible to spillage.

Accordingly, the present invention relates to a device for stabilizing and supporting a receptacle or spherical object, said device comprising first and second support elements wherein:

the first support element comprises a frusto-conical support portion defining an annular rim at an outer periphery thereof, an inner surface and an outer surface on opposite sides thereof, at least a portion of the inner surface forming a receptacle or spherical object contact surface, and a base portion connecting the first support element to the second support element;

the second support element comprises an outwardly flared support portion defining an annular rim at an outer periphery thereof, an inner surface and an outer surface on opposite sides thereof, at least a portion of the inner surface forming a receptacle or spherical object contact surface, and a base portion which connects to the corresponding base portion of the first support element;

wherein the base portions of the first and second support elements together form a central aperture through the device allowing communication between an interior of the first support element and an interior of the second support element.

In a non-limiting embodiment, the device may be made from an elastomeric material selected based on the knowledge one skilled in the art and the particular application for the device. As an example, yet without wishing to be limiting in any manner, the elastomeric material may be a silicone elastomer. In certain embodiments, the use of a food grade silicone may be preferred. More particularly, silicones of a durometer ranging from 20 to 60 can be especially useful in certain embodiments of the invention.

In other non-limiting embodiments, the inner surface of one or both of the frusto-conical support portion of the first support element and the outwardly flared support portion of the second support element is made of a non-skid material such that the receptacle or spherical object does not slide within the central aperture.

It is also envisioned that, in other non-limiting embodiments, at least the inner surface of one or both of the frusto-conical support portions of the first support element and the outwardly flared support portion of the second support element can be made of a flexible material effective to form a suction grip with the receptacle or spherical object. In further embodiments, which are non-limiting, the annular rim of one or both of the first support element and the second support element can be made of a flexible material effective to form a suction grip with the receptacle, spherical object or a planar surface.

The frusto-conical support portion of the first support element can, in certain non-limiting embodiments, also be shaped and dimensioned to accommodate the lower part of the receptacle or spherical object such that the receptacle or spherical object can remain tilted when the receptacle or spherical object is positioned in the portion of the aperture formed by the frusto-conical support portion. Further, the frusto-conical support portion of the first support element and the outwardly flared support portion of the second support element can also be shaped and dimensioned to accommodate the lower parts of receptacles or spherical objects of different sizes, yet without being limiting in any way. Additionally, yet without being limiting, the frusto-conical support portion of the first support element can be shaped and dimensioned to accommodate a greater portion of the lower part of a receptacle or spherical object as compared to the amount of the lower part of a receptacle or spherical object accommodated within the outwardly flared support portion of the second support element.

In further non-limiting embodiments, the device may be made from a heat resistant material. As one exemplary yet non-limiting embodiment, the heat resistant material may be an elastomeric material as described in further detail above, for example but not limited to food grade silicones. In embodiments such as these, which are non-limiting, it is envisioned that at least one of the first support element and the second support element can be shaped and dimensioned to securely fit onto the top of a pot, saucepan or other heating implement.

As described above, a receptacle may be any receptacle that may require stabilization in the manner described herein. While flat-bottom receptacles with perpendicular wall portions may be used with the device, it is in certain embodiments particularly useful with receptacles having a rounded, partly rounded or frusto-spherical bottom portion. These may include, without limitation, bowls, pots, saucepans, round-bottom grill pans and pet food dishes.

BRIEF DESCRIPTION OF THE DRAWINGS

These and other features of the invention will become more apparent from the following description in which reference is made to the appended drawings wherein.

DETAILED DESCRIPTION

Described herein with reference to FIGS. 1-6 is one example of a stabilizing device for receptacles or spherical objects of various shapes and sizes, in accordance with an embodiment of the invention.

Figure 1:
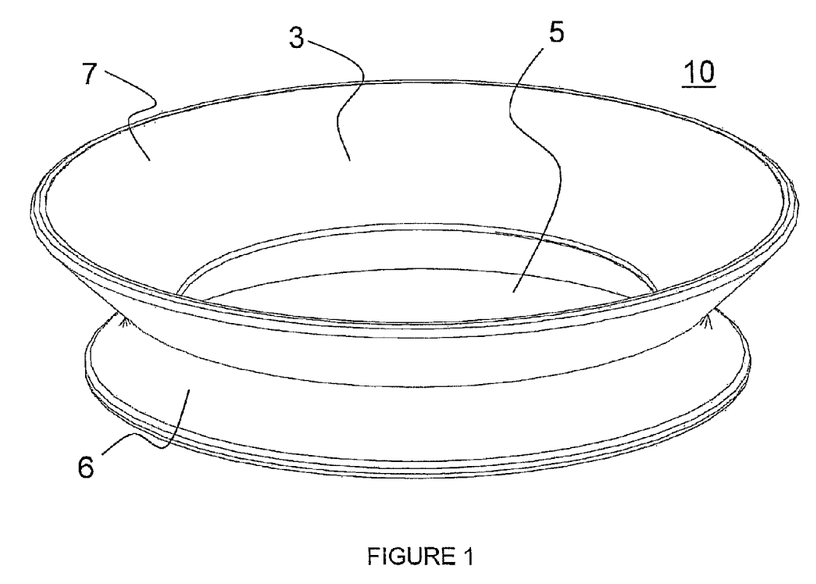
FIG. 1 shows a perspective view of an example of a stabilizing device, in accordance with an embodiment of the present invention.
Figure 2:
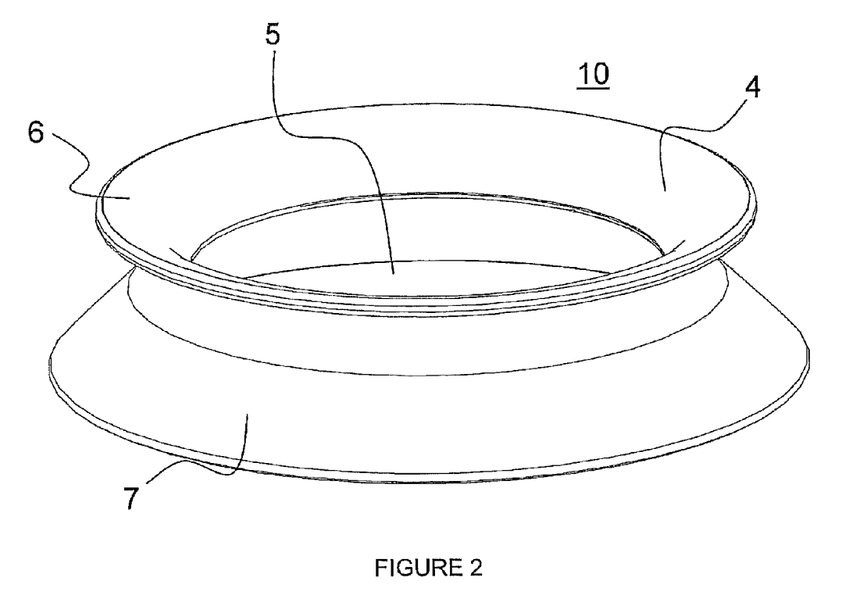
FIG. 2 shows a second perspective view of the stabilizing device shown in FIG. 1, in accordance with an embodiment of the present invention.

In the example shown in FIGS. 1 and 2, the stabilizing device (10) is a single molded piece manufactured from food grade silicone, which as described above may be of varied durometers including but not limited to silicone of a durometer ranging from about 20 to 60. The device as shown is particularly useful for the preparation and serving of food in both commercial and residential applications, although it is envisioned that the device can also be used for stabilizing pet food dishes and other applications whereby it is deemed beneficial to stabilize a receptacle used for mixing, heating, serving, displaying or storing its contents.

A receptacle (1), which in the illustrated embodiment is a bowl, can be partially disposed within the interior space of the stabilizing device (10), which is formed by first (7) and second (6) support elements in two possible orientations, referred to herein as primary and secondary orientations.

The first (7) and second (6) support elements as depicted in the illustrations shown take the form, respectively, of linear and arced flanges. The linear (7) and arced (6) flanges work in conjunction with one another to accomplish different sets of tasks dependant on the orientation of the device (10). For example, as illustrated in FIG. 3(A-D), a bowl (1) that is partially disposed within the interior space of the ring when the device is set against a planar surface (2) in the primary orientation, whereby contact is made between the primary contact surface (3) and the peripheral surface of the bowl (1), will result in friction between the primary contact surface (3) and peripheral surface of the bowl (1), and also between the planar surface (2) and the secondary contact surface (4) thus stabilizing the bowl from a broad angular range of external forces related to the field of use.

As illustrated in FIG. 4(A-D), a bowl (1) that is partially disposed within the interior space of the ring when the device is set against a planar surface (2) in the secondary orientation, whereby contact is made between the secondary contact surface (4) and the peripheral surface of the bowl, can be suctioned to the planar surface (2) by way of the user exerting downward pressure with both hands placed equidistant from one another on the rim of the bowl (1). When pressure is exerted in the described manner the linear flange (7) will collapse and become flush with planar surface (2) forming a seal. A second seal is created simultaneously between the secondary contact surface (2) and the peripheral surface of the bowl (1). The creation of these two seals results in a suction lock between the bowl and the device, and also between the device and the planar surface, thus securing the bowl from external forces related to the field of use.

When used in the manner described above, the stabilizing device can keep a bowl or other receptacle stationary (both in level and tilted positions) when subject to external forces related to the field of use (such as mixing, whisking, serving). In certain non-limiting embodiments, stabilization of the receptacle in a tilted position is achieved in the primary orientation as shown in FIG. 3 (A-D). In addition, the stabilizing device can stabilize receptacles that are stacked together for storage purposes.

Figure 3A:
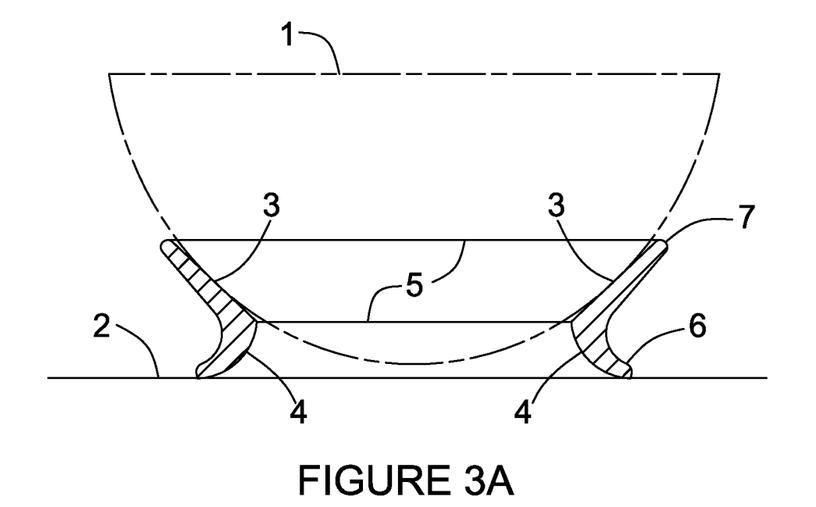
FIG. 3A-D shows a cross sectional view of the stabilizing device shown in FIG. 1, in a first orientation at 4 different tilt angles stabilizing a receptacle in accordance with an embodiment of the present invention.
Figure 3B:
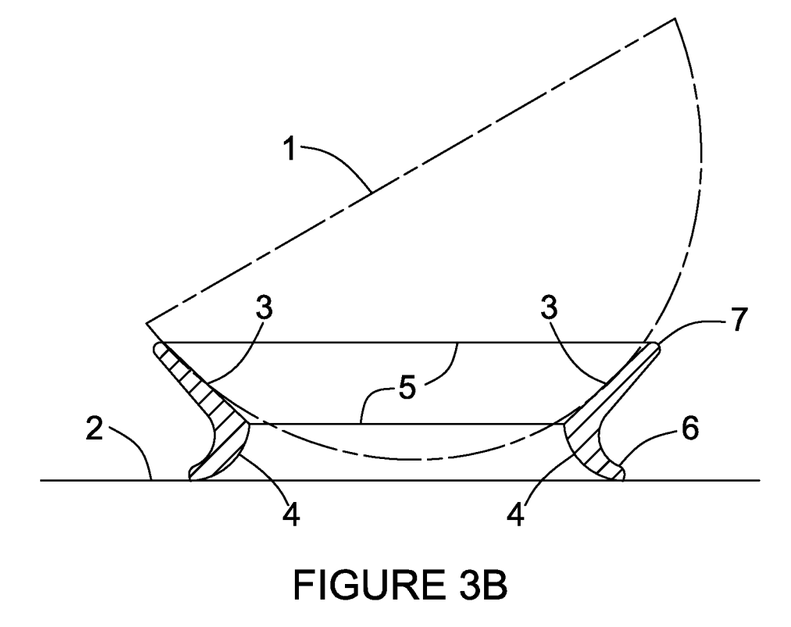
Figure 3C:
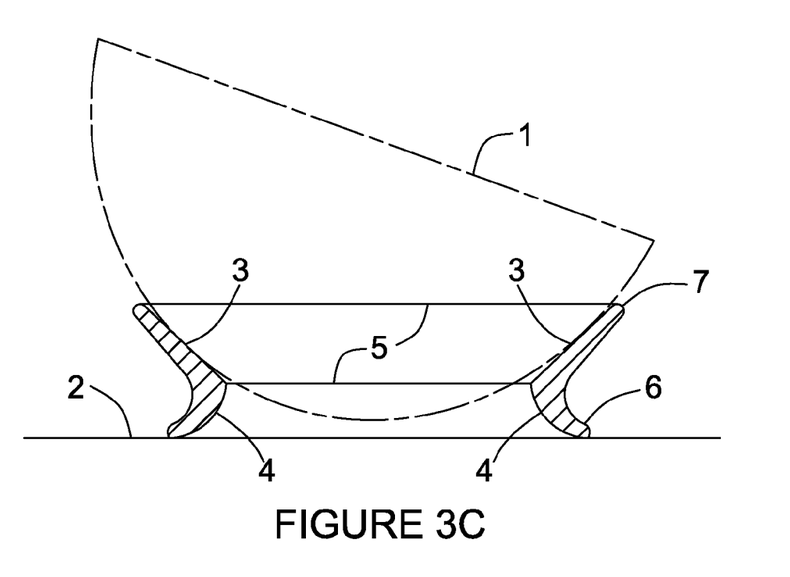
Figure 3D:
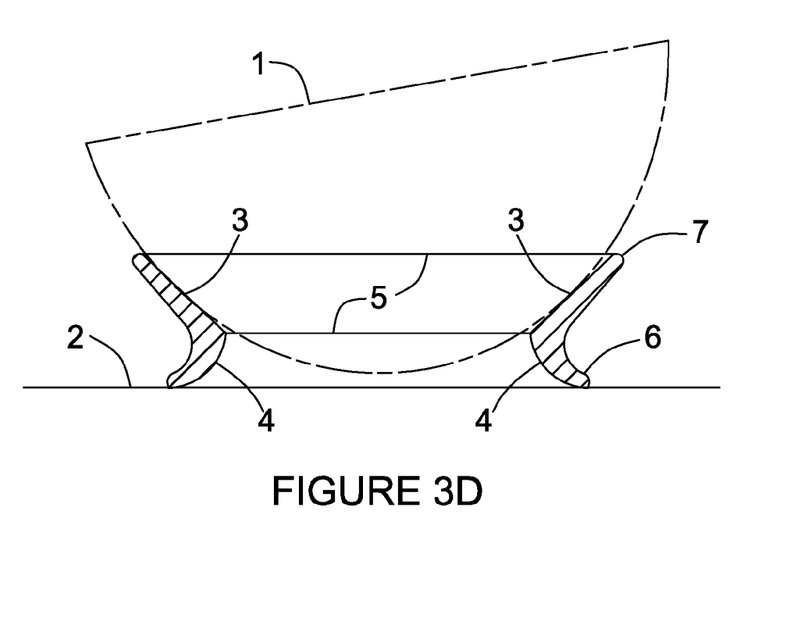
Figure 4A:
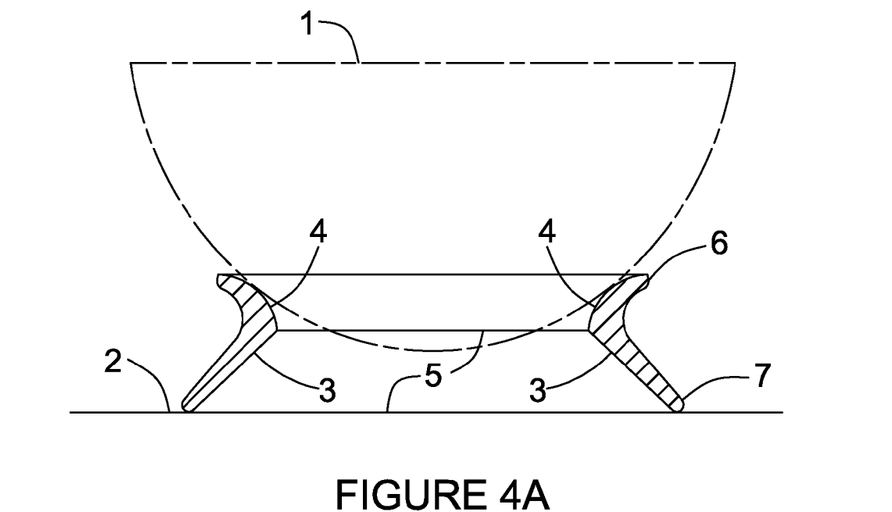
FIG. 4A-D shows a cross sectional view of the stabilizing device shown in FIG. 1, in a second orientation at 4 different tilt angles stabilizing a receptacle in accordance with an embodiment of the present invention.
Figure 4B:
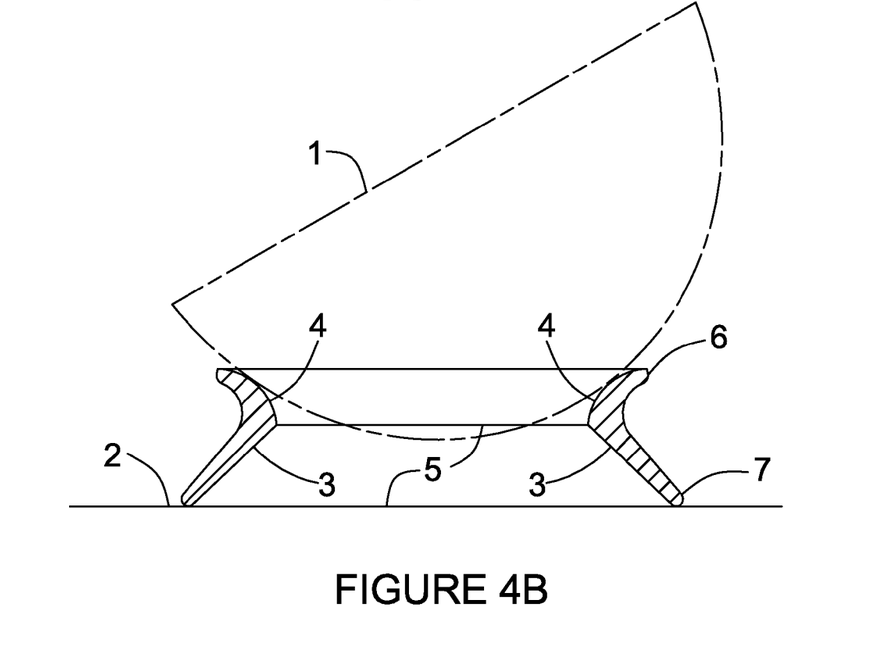
Figure 4C:
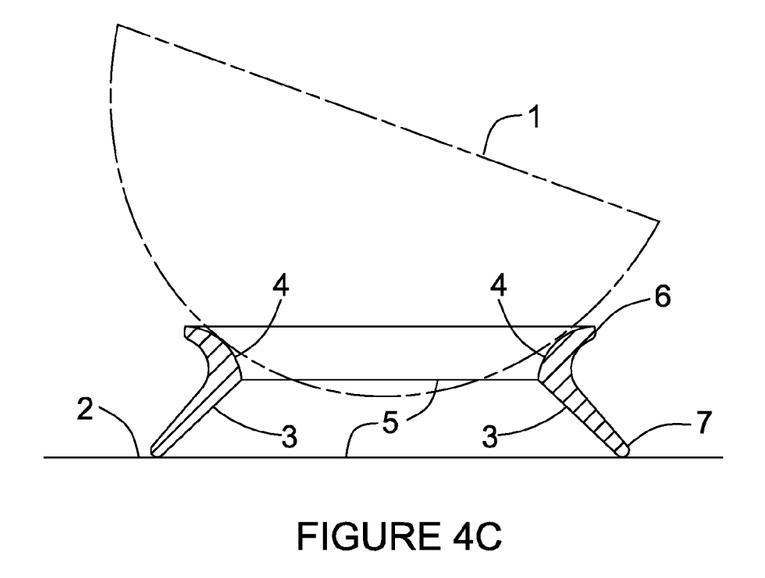
Figure 4D:
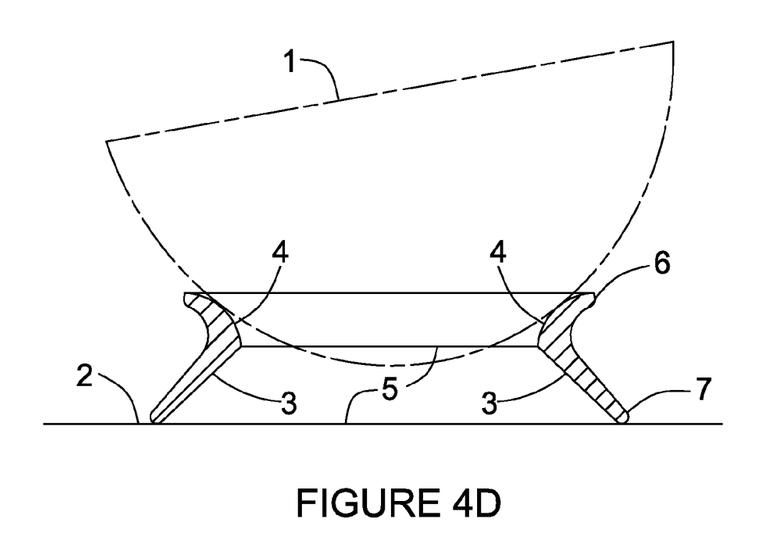
Figure 5:
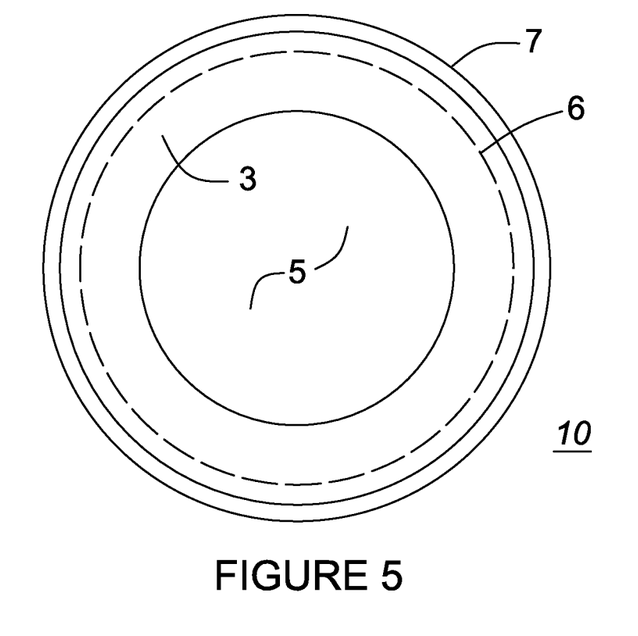
FIG. 5 shows a top view of the stabilizing device shown in FIG. 1, in accordance with an embodiment of the present invention.
Figure 6:
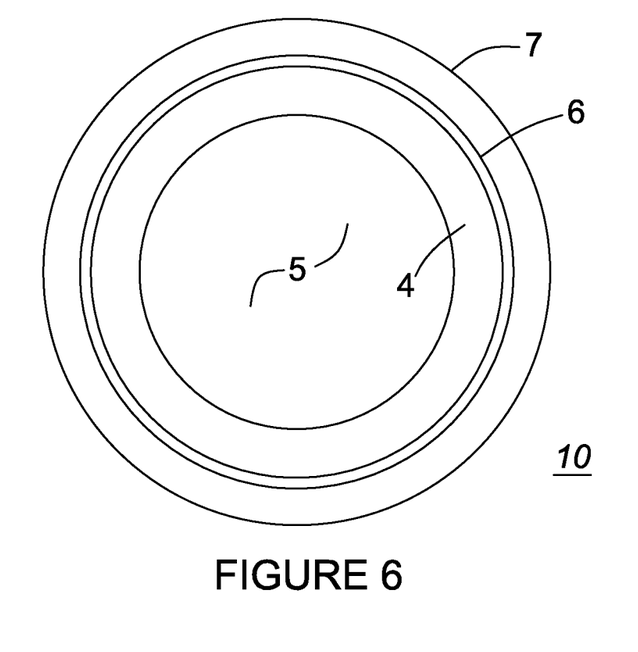
FIG. 6 shows a bottom view of the stabilizing device shown in FIG. 1, in accordance with an embodiment of the present invention.

The stabilizing device can also be used, for instance in the primary orientation shown in FIG. 3 (A-D), to stabilize a receptacle (both in level FIG 3A and tilted positions (FIG 3B-3D) in an improvised double boiler apparatus whereby the user has elected to use a receptacle (1), such as a bowl, as the upper vessel. The device (10) would be placed between the lower vessel (e.g. a saucepan or pot) and the upper vessel (e.g. a mixing bowl). The use of the device in this manner also serves to insulate the contents of the upper vessel from excessive heat transfer emanating from the lower vessel.

The device can also be used to facilitate the plating of food from a round bottom grill pan, commonly known as a 'wok'. If the user desires to plate food from a counter area rather than the heating appliance, the user may remove the wok from its heat source and set it at rest within the device in its primary orientation.

For catering and food serving applications where a receptacle, e.g. a bowl, is used as the serving vessel and which benefits from assistance in maintaining a temperature for food contents other than that of its serving environment, the device may be pre-heated or pre-cooled prior to use in this application. Once the stabilizing device is in a heated or cooled state it can be used in its primary orientation to achieve the desired effect of assisting in the maintenance of a temperature for the food contents other than that of its serving environment. The resulting contact between the bowl's peripheral surface and the primary contact surface of the device will allow for the device's temperature to be imparted on the on the receptacle and its contents, thus assisting in the maintenance of a desired temperature for the food.

The stabilizing device forms a depression (5) around a center such that, in operation, a receptacle can be positioned within the depression (5) such that the receptacle can be tilted over a range of tilt angles and still be held securely in position. In a preferred embodiment, yet without wishing to be limiting in any way, the receptacle is a bowl or pan comprising a rounded or frusto-spherical bottom portion dimensioned to rest within the depression (5).

In addition, since the stabilizing device is preferably made of a non-slip substance, when the receptacle, e.g. bowl is tilted and seated in the depression, the bowl will not slip out of the tilted position. This feature is particularly useful when the bowl is used for mixing, since it is often convenient for a user to tilt the bowl while mixing its contents.

As a further possible application for the stabilizing device described herein, it is envisioned that the stabilizing device may also be used to stabilize spherical objects, such as but not limited to exercise balls and the like. Exercise balls are well known in the art by many names, such as the Swiss ball, balance ball, birth ball, body ball, fitness ball, gym ball, gymnastic ball, physioball, Pilates ball, Pezzi ball, sports ball, stability ball, therapy ball, or yoga ball. For the inexperienced user, or even a skilled practitioner who is learning different positions or exercises, it may in certain circumstances be useful to stabilize the exercise ball.

Thus, in further non-limiting embodiments of the invention the stabilizing device may be dimensioned in a manner which allows for stabilizing of a sphere. Such a sphere may be of a variety of dimensions, and therefore it is further envisioned that the stabilizing device can be fabricated in a variety of different dimensions as well, so that it may accommodate the shape and size of the spherical object. The material used to manufacture this variation of the device will, in many embodiments, be an elastomeric material. Silicone rubber is one non-limiting embodiment which is preferred for this application, although it need not be of the food-grade variety. The durometer of the silicone rubber for this application can, without wishing to be limiting, be in the range of about 60 to about 70.

When in operation as a stabilization device for spherical objects, such as an exercise ball, the device can be used in either of the primary or secondary orientations described above. However, in certain embodiments it may be preferred to use the device in its primary orientation when serving to stabilize an exercise ball.

One or more currently preferred embodiments have been described by way of example. It will be apparent to persons skilled in the art that a number of variations and modifications can be made without departing from the scope of the invention as defined in the claims.

What is claimed is:

1. A device for stabilizing and supporting a receptacle or spherical object, said device comprising first and second support elements wherein: the first support element comprises a frusto-conical support portion defining an annular rim at an outer periphery thereof, a liner surface and an outer surface on opposite sides thereof, at least a portion of the inner surface forming a receptacle or spherical object contact surface, and a base portion connecting the first support element to the second support element; the second support element comprises an outwardly flared support portion defining an annular rim at an outer periphery thereof, a curved surface and an outer surface on opposite sides thereof, at least a portion of the inner surface forming a receptacle or spherical object contact surface, and a base portion which connects to the corresponding base portion of the first support element; wherein the base portions of the first and second support elements together form a central aperture through the device allowing communication between an interior of the first support element and an interior of the second support element, and wherein at least the annular rim and the inner surface of the frusto-conical support portion of the first support element and the annular rim and outwardly flared support portion of the second support element are made of a non-skid material, wherein a depression is formed between an interior of the first support element and the central aperture and around a center whereby, in operation, said depression is adapted to allow positioning of said receptacle or spherical object within the depression such that the receptacle or spherical object can be tilted over a range of tilt angles when positioned within either the first or second support element and held securely in position, and whereby the depression is dimensioned to receive a receptacle or spherical object comprising a rounded or frusto-spherical bottom portion.

2. The device of claim 1, wherein said device is made from an elastomeric material.

3. The device of claim 2, wherein the elastomeric material is a silicone elastomer material.

4. The device of claim 3, wherein the elastomeric material is a food grade silicone.

5. The device of claim 4, wherein the silicone is of a durometer ranging from about 20 to about 60.

6. The device of claim 2, wherein the elastomeric material is a silicone elastomer material of a durometer ranging from about 60 to about 70.

7. The device of claim 1, wherein the non-skid material is effective to grip the receptacle or spherical object such that the receptacle or spherical object does not slide within the central aperture when in use.

8. The device of claim 1, wherein at least the frusto-conical support portion of the first support element and the outwardly flared support portion of the second support element are made of a flexible material effective to form a suction grip between a planar surface and the receptacle or spherical object when the receptacle or spherical object is supported within the outwardly flared support portion of the second support element.

9. The device of claim 1, wherein the frusto-conical support portion of the first support element is shaped and dimensioned to accommodate a lower part of the receptacle or spherical object such that the receptacle or spherical object can remain tilted when the receptacle is positioned in a portion of the aperture formed by the frusto-conical support portion.

10. The device of claim 1, wherein the frusto-conical support portion of the first support element and the outwardly flared support portion of the second support element are shaped and dimensioned to accommodate lower parts of receptacles or spherical objects of different sizes.

11. The device of claim 1, wherein the frusto-conical support portion of the first support element is shaped and dimensioned to accommodate a greater portion of a lower part of a receptacle or spherical object as compared to an amount of the lower part of the receptacle or spherical object accommodated within the outwardly flared support portion of the second support element.

12. The device of claim 1, wherein said device is made from a heat resistant material.

13. The device of claim 12, wherein the heat resistant material is a food grade silicone.

14. The device of claim 12, wherein at least one of the first support element and the second support element is shaped and dimensioned to securely fit onto a top of a heating device.

15. The device of claim 14, wherein the heating device is a pot or saucepan.

16. The device of claim 1, wherein the receptacle is a bowl, pot, saucepan, round-bottom grill pan, or pet food dish.

17. The device of claim 1, wherein the spherical object is an exercise ball.

* * * * *